(12) United States Patent
West

(10) Patent No.: US 7,198,833 B1
(45) Date of Patent: Apr. 3, 2007

(54) ARTIFICIAL STONE MATERIAL AND METHOD OF MANUFACTURE THEREOF

(76) Inventor: Albert C. West, 179 West St., Southbridge, MA (US) 01550

( * ) Notice: Subject to any disclaimer, the term of this patent is extended or adjusted under 35 U.S.C. 154(b) by 198 days.

(21) Appl. No.: 10/611,581

(22) Filed: Jun. 30, 2003

(51) Int. Cl.
  B32B 5/00 (2006.01)
  B32B 5/16 (2006.01)
  B32B 27/18 (2006.01)
  B32B 27/20 (2006.01)
  B44F 9/04 (2006.01)

(52) U.S. Cl. ............. 428/15; 428/304.4; 428/310.5; 428/313.3; 428/313.5; 428/313.9; 428/317.9; 428/318.4; 428/319.3; 264/73; 264/245; 427/280; 427/281

(58) Field of Classification Search ............... None
See application file for complete search history.

(56) References Cited

U.S. PATENT DOCUMENTS

| | | | | |
|---|---|---|---|---|
| 3,050,785 A | * | 8/1962 | Cunningham | 264/246 |
| 3,230,184 A | | 1/1966 | Alford | 260/2.5 |
| 3,488,246 A | * | 1/1970 | Duggins | 428/15 |
| 3,562,379 A | * | 2/1971 | Duggins | 264/173.18 |
| 3,670,060 A | * | 6/1972 | Cuffaro et al. | 264/77 |
| 3,873,475 A | | 3/1975 | Pechacek et al. | 260/2.5 B |
| 3,904,791 A | * | 9/1975 | Iverson et al. | 427/277 |
| 4,053,448 A | | 10/1977 | Holle | 260/40 R |
| 4,188,316 A | * | 2/1980 | Sawada | 524/779 |
| 4,433,070 A | * | 2/1984 | Ross et al. | 523/171 |
| 4,446,177 A | * | 5/1984 | Munoz et al. | 428/15 |
| 4,734,302 A | * | 3/1988 | Baskin | 428/15 |
| 4,839,394 A | | 6/1989 | Champion | 521/55 |
| 4,849,456 A | | 7/1989 | Champion | 521/54 |
| 4,956,030 A | * | 9/1990 | Baskin | 156/61 |
| 5,055,324 A | * | 10/1991 | Stecker | 427/281 |
| 5,112,657 A | | 5/1992 | Melber | 428/15 |
| 5,244,941 A | * | 9/1993 | Bruckbauer et al. | 523/171 |
| 5,275,852 A | * | 1/1994 | Jones et al. | 428/15 |
| 5,281,633 A | * | 1/1994 | Okuno et al. | 523/513 |
| 5,304,592 A | * | 4/1994 | Ghahary | 524/437 |
| 5,364,672 A | * | 11/1994 | Schultze-Kraft | 428/15 |
| 5,422,391 A | | 6/1995 | Inoue | 524/427 |
| 5,476,895 A | | 12/1995 | Ghahary | 524/437 |
| 5,624,510 A | * | 4/1997 | Uchida et al. | 156/62.2 |
| 5,648,144 A | | 7/1997 | Maurer et al. | 428/141 |
| 6,015,519 A | * | 1/2000 | Lapikas et al. | 264/74 |
| 6,025,052 A | | 2/2000 | Maurer et al. | 428/141 |
| 6,056,904 A | * | 5/2000 | Wiener | 264/477 |
| 6,194,051 B1 | * | 2/2001 | Gagas et al. | 428/99 |
| 6,306,321 B1 | * | 10/2001 | Mukai et al. | 264/73 |
| 6,309,562 B1 | | 10/2001 | Sakai et al. | 252/301.36 |
| 6,365,662 B1 | | 4/2002 | Sakai et al. | 524/494 |
| 6,387,304 B2 | | 5/2002 | Mukai et al. | 264/73 |
| 6,387,504 B1 | | 5/2002 | Mushovic | 428/413 |
| 6,531,222 B1 | * | 3/2003 | Tanaka et al. | 428/402 |
| 6,548,157 B2 | * | 4/2003 | Ghahary | 428/319.3 |
| 6,747,075 B2 | * | 6/2004 | Nardi et al. | 523/218 |
| 6,790,393 B1 | * | 9/2004 | Kraker | 264/71 |
| 2001/0043996 A1 | * | 11/2001 | Yamada et al. | 428/34.4 |
| 2001/0051249 A1 | * | 12/2001 | Gagas et al. | 428/99 |
| 2002/0004111 A1 | | 1/2002 | Matsubara et al. | 428/34.4 |
| 2002/0086140 A1 | | 7/2002 | Ghahary | 428/143 |
| 2002/0169236 A1 | * | 11/2002 | Halterman et al. | 523/218 |
| 2002/0178872 A1 | * | 12/2002 | Robinson et al. | 52/309.1 |

OTHER PUBLICATIONS

Natural-stone.com Article "Granite versus Corian" by Fred Hueston, dated Jan. 14, 2003, 2 pgs., www.natural-stone.com/granitevscorian.html.
SOLIDSURFACE Journal, Article "What is Solid Surface?", dated Jan. 14, 2003, 4 pgs.. www.solidsurfacemagazine.com.what_is.htm.

* cited by examiner

*Primary Examiner*—Vivian Chen
(74) *Attorney, Agent, or Firm*—Alix, Yale & Ristas, LLP

(57) ABSTRACT

An artificial stone material having an improved natural stone appearance and texture is prepared from thermosetting resin, curing agent, microspheres and additives. The resin and curing agent are thoroughly mixed to form a catalyzed resin mixture. The microspheres are added to the catalyzed resin mixture and mixed to a viscosity of about $950 \times 10^6$ to about $1590 \times 10^6$ to form a catalyzed base material. The additives are worked into the catalyzed base material to provide a catalyzed stone mixture having a desired natural stone appearance. The catalyzed stone mixture is molded or applied to a surface at the point of use and allowed to cure to form the artificial stone material.

10 Claims, No Drawings

ARTIFICIAL STONE MATERIAL AND METHOD OF MANUFACTURE THEREOF

FIELD OF THE INVENTION

This invention relates generally to a manmade material having an improved stone like appearance and comprising polymers. The artificial stone material can have a density of less than 1 g/cc.

BACKGROUND OF THE INVENTION

Stone is considered a very desirable building material for its aesthetics. However, despite the desirable appeal of natural stone its use is limited by certain of its properties. In particular, natural stones are very dense, hard and have high specific gravity. Thus, stone materials are difficult to fabricate, difficult to use other than by the traditional lay up methods and require substantial structures to support the weight of the stone fabrication. Some properties for natural stone materials are summarized in Table 1 below:

TABLE 1

| material | specific gravity | density (lb/ft$^3$) |
|---|---|---|
| bluestone | 2.5–2.6 | 159 |
| granite | 2.6–2.7 | 165 |
| marble | 2.6–2.9 | 170 |
| sandstone | 2.0–2.6 | 143 |
| slate | 2.6–2.9 | 172 |
| cement[1] | 1.5–2.4 | 100–144 |

[1]The specific gravity and density of cement materials will depend on the filler materials used.

In an effort to maintain the aesthetics appeal of natural stone products while overcoming some of their problems, various polymer-based solid surface materials have been produced. One example of such solid surface material is CORIAN, available from DuPont de NEMOURS and Company. These solid surface materials are easier to fabricate than natural stone products. Unfortunately, solid surface materials are readily distinguishable from natural stone products, as the appearance of known solid surface products can be described as a speckled solid color that does not closely approximate the more complicated look and texture of natural stone. Further, most solid surface products exhibit specific gravities of 1.7 to 1.8. Thus, considerable support is still required for structures fabricated from such high density solid surface products.

High density solid surface products are also difficult to manufacture. Typically, such products require considerable mixing and careful removal of all air from the mixture after the components are mixed and prior to casting or forming the solid surface product. Naturally, this makes manufacture of the high density solid surface products themselves, as opposed to manufacture of an article from a previously fabricated high density solid surface product, difficult outside of a fairly sophisticated manufacturing facility. Thus, there remains a demand for a low density product having the appearance and texture of natural stone that can be readily prepared and used at the final location.

Engineered stone is an attempt to provide man-made materials that are more reminiscent of natural stone than solid surface materials. Engineered stone typically comprises substantial amounts of natural stone filler combined with a small amount of binder. The binder may be a polymer resin or cement. Engineered stone achieves a much more "natural" look than solid surface materials. However, engineered stone is a high density material with typical densities running over 2 grams per cubic centimeter (g/cc). Additionally, engineered stone precursors such as slabs or sheets are manufactured using sophisticated processes. Such engineered stone products are not suitable for manufacture from raw materials at an installation site. Additionally, engineered stone products retain the hardness of natural stone, making cutting, drilling and forming of the engineered stone products difficult without specialized tools and procedures.

SUMMARY OF THE INVENTION

An object of the invention is to provide a low-density product that provides the aesthetic appearance of natural stone materials.

Another object of the invention is to a low-density synthetic stone material that can be readily produced and worked at the point of use.

Other objects and advantages of the invention will become apparent from the drawings and the specification.

Briefly stated, one embodiment of the invention comprises a manmade artificial stone material having the look of some types of natural stone. In some especially advantageous embodiments, the inventive artificial stone material in cured form has a density of one gram per cubic centimeter or less and a specific gravity of one or less. Thus, the inventive artificial stone materials are considerably lighter and less dense than known solid surface or engineered stone materials while providing an appreciably improved natural stone appearance.

The inventive synthetic stone product comprises a thermoset resin, a curing agent, microspheres and additives for color and texture. In one advantageous embodiment, the thermoset resin is a polyester resin and the curing agent is methyl ethyl ketone peroxide.

The additives comprise at least one of dry temper color, dry mortar, dye, pigment, paint, ash, glass, mica and stone dust. Aluminum trihydrate can be added to improve fire resistance. Milled fibers can be added to improve strength. The ingredients, amounts and particle sizes will vary depending on the color and texture desired.

The inventive artificial stone may be prepared and cured at the point of use, something not possible with solid surface and engineered stone products. In this embodiment, a predetermined amount of thermoset resin and a predetermined amount of curing agent are combined and mixed. After thorough mixing the microspheres are added and mixed with the resin/curing agent mixture at a slow rate and with minimal agitation to a required viscosity. The slow mixing rate and minimal agitation minimize microsphere breakage. Once a desired viscosity is obtained the additives are "worked" into the catalyzed base material to form a catalyzed stone mixture.

The catalyzed stone mixture can be molded into a suitable shape. The cured item when removed from the mold will have a very realistic natural stone appearance dependent on the additives used. Alternatively, the catalyzed stone mixture can be applied to, or sculpted on, a surface, such as a wall, to provide that surface with a realistic stone appearance. Since the inventive artificial stone material has a low density, the surface will not typically require special structures to support the artificial stone facade.

Artificial stones produced from the inventive composition can be readily cut and drilled with ordinary woodworking tools. Additionally, artificial stones produced from the inventive composition can be readily fastened to horizontal or vertical surfaces such as walls, using common mechanical fasteners such as nails without requiring predrilling of the artificial stones. The inventive artificial stones can also be applied to surfaces using adhesives.

In general, the material of the invention may be alternately formulated to comprise, consist of, or consist essentially of, any appropriate components herein disclosed. The material of the invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

DETAILED DESCRIPTION OF THE INVENTION

The inventive artificial stone materials are produced from a composition comprising a thermoset resin, a curing agent, microspheres, and additives. The thermoset resins are useful in the invention include, for example, polyester resins including isophthalate, orthophthalate and terephthalate polyester resins, polyethylene terephthalate resin, dicyclopentadiene resins (DCPD), vinyl ester resins and bisphenol resins. The thermoset resin is advantageously a polyester resin. The curing agent used in the inventive artificial stone composition is selected from materials known to initiate cross-linking of the chosen thermoset resin. Thus, polyester resins will typically use methyl ethyl ketone peroxide as a curing agent while bisphenol resins will typically use an amine based curing agent. The amount of curing agent used is dependent on the amount of thermoset resin used in the composition. For some thermoset resins such as polyester resins, the amount of curing agent used may be varied to increase or decrease the cure time of the catalyzed mixture.

Microspheres comprise a very thin shell surrounding a hollow core. Typically, a microsphere is spherical. The shell may be comprised of various materials such as for example, glass, silica, polymers, ceramics, alumina, silica. Microspheres typically have a particle size range of about 5 to about 400 microns. Because the microspheres have a very thin shell surrounding a relatively large volume, they have a very low effective density that can be 0.2 g/cc or less. Some microsphere products include EXPANCEL products available from Nobel Industries, Q-CEL products available from the PQ Corporation, PM hollow sphere products available from the PQ Corporation and EXTENDOSPHERES products available from the PQ Corporation.

The additives are used to provide the inventive artificial stone product with an appearance closely approximating natural stone of a selective type. Therefore, the additives used will be dependent on the type of stone appearance desired. In general, the additives can comprise one or more of dry temper colors, dry mortar, dyes, pigments, paint, wood ash, mica, stone particles and glass particles.

The inventive artificial stone material can advantageously be prepared directly at the point of use. Preparation of the artificial stone material starts with adding the curing agent to the thermoset resin. The amount of thermoset resin used is determined by the amount of product needed. The amount of curing agent needed is based on the type of thermoset resin chosen and the desired cure time. This catalyzed resin mixture is thoroughly mixed by any suitable method. There is no need to eliminate air entrainment into this mixture.

Microspheres are added by pouring directly over the top of the catalyzed resin mixture. Typically, microspheres are added in the range of about 8% to about 63% by weight. The resulting mixture is mixed slowly to blend the microspheres into the catalyzed resin mixture while minimizing breakage of the microspheres. Mixing speed can be increased if the amount of microspheres added is also increased to account for breakage. Commercially available paddle mixers have been found suitable for this use.

The catalyzed resin and microsphere mixture is mixed to a suitable viscosity to form a catalyzed base material. Typically, a viscosity of about $950 \times 10^6$ to about $1590 \times 10^6$ cps (HB viscometer available from Brookfield Engineering of Middleboro, Mass., TE spindle, 1 rpm, factor 40 mm) has been found suitable. As a comparison, some known polymer materials have been found to have the following viscosities:

polymer based solid surface catalyzed mixtures about 360,000 cps polyester resin based auto body filler about 590,000 to 700,000 cps polyester based fairing compound about 600,000 to 900,000 cps Experience has shown that base materials having a viscosity substantially lower than about $950 \times 10^6$ to about $1590 \times 10^6$ cps are not able to achieve a suitable natural stone appearance. This is due to the fact that lower viscosity materials tend to more completely homogenize additives resulting in an unnatural appearance. Higher viscosities tend to provide a catalyzed stone mixture that crumbles and is difficult or impossible to form into an artificial stone surface. With some experience, a suitable catalyzed base material viscosity can be achieved by workers at the point of use without the need for measuring equipment.

The catalyzed base material is placed in a mixing container of suitable size. One or more of the additives are sprinkled over the catalyzed base material. Subsequently, the catalyzed base material and additives are "worked" or "lightly mixed" to incorporate the additives into the catalyzed base material to form the stone patterning. One method of working is to roll one or more of the additives onto the catalyzed base material. After rolling, pieces of catalyzed base material and additive are broken off and recombined onto other portions of the catalyzed base material. This breaking off and recombining process is repeated until the desired stone effect is achieved. Another working method that may be used separately or in addition to the above method is rolling the catalyzed base material in one or more of the additives and folding the rolled catalyzed base material/additives. The rolling and folding process is repeated until the desired stone effect is achieved. The additives may be added sequentially or all at once during working depending on the stone effect desired. This working or mixing step is surprisingly important and deviations from the inventive procedure, even with the disclosed materials, may result in materials having an unsatisfactory appearance. It should be understood that the intent of this mixing step is to provide the catalyzed base material with veins or layers of the different additives, thereby providing the look of a natural stone product. To this end, it is important that the additives are not smeared or homogenized completely into the catalyzed base mixture. For this reason, an acceptable natural stone product cannot be achieved if the base material and additives are mixed using conventional methods such as stirring, shaking, paddle mixer, rotary mixer or cement mixer.

The catalyzed stone mixture can be packed into a flexible mold. After curing, the mold is removed to provide an artificial stone material closely approximating the look and texture of a natural stone. Alternatively, the catalyzed stone mixture can be transferred to a surface and sculpted. Typically sculpting is done by hand due to the high viscosity of the catalyzed stone mixture. Appropriate tools such as spatulas, knives, shovels, etc. may also be used. After curing, the sculpted surface of the artificial stone material approximates the look and texture of a natural stone surface.

It should be appreciated that most solid surface products and engineered stone products must be manufactured at a centralized location under controlled conditions using specialized equipment and transported in a cured state to an installation site. Once at the installation site these products are fabricated in the cured state and installed onto a working surface such as a wall or countertop. The inventive artificial stone material is quite different in that the component materials can be mixed right at the point of use. The mixed catalyzed artificial stone mixture can be applied to a desired working surface before curing. This allows the installer flexibility in fabrication and installation that is not possible with known materials.

Another advantage of the inventive artificial stone material is the ability to attach or fasten the formed inventive stones directly to an existing wall. The formed stones, while having a very realistic appearance, are considerably softer and lighter than either natural stone or other engineered stone or solid surface products. For this reason, common fasteners such as nails and screws can be used to attach the inventive stones to many existing surfaces without the need for predrilling of the stones and without the need for support structures. The inventive stones can also be attached to existing surfaces using a variety of common adhesives.

The catalyzed stone mixture has additives worked throughout its extent. Thus, the resulting inventive artificial stone material will have a natural stone appearance throughout its extent and does not require surface coatings to achieve this appearance. The inventive stone material can be cut using common woodworking tools or PVC cutters and the cut surfaces will retain the natural stone appearance. The cut surfaces can be retextured by chipping pieces off using a knife-edge.

It should be understood that the following examples are included for purposes of illustration so that the invention may be more readily understood and are in no way intended to limit the scope of the invention unless otherwise specifically indicated.

| EXAMPLE 1 grey field stone | | |
| --- | --- | --- |
| resin | orthophthalate waxed resin[1] | 3 gallons |
| curing agent | methyl ethyl ketone peroxide[2] | 1% to 3% by resin volume |
| microspheres | Q-CEL 6019[3] | 28% to 39% by resin weight |
| additive | 92 h iron black temper color[4] | 10 tablespoons |
| additive | 10 h light buff temper color[5] | 4 tablespoons |
| additive | wood ash[6] | 6 cups |
| additive | glass particles[7] | as needed |

[1]available from AOC of Quebec, Canada.
[2]available from any commercial source as a 9% to 30% active peroxide mixture.
[3]available from Kish of Pennsylvania.
[4]available from Soloman Colors of Chicago.
[5]available from Soloman Colors of Chicago.
[6]available from commercial suppliers.
[7]available as, for example, DIAMOND DUST from masonry suppliers.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form the catalyzed base material. When the desired viscosity is achieved, the mixing is stopped. The catalyzed base material will have a white or slightly off white color.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff is added while working continues. The mixing provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

| EXAMPLE 2 red-brown sandstone | | |
| --- | --- | --- |
| resin | modar 7607[1] | 3 gallons |
| curing agent | methyl ethyl ketone peroxide[2] | 9% to 30% by resin volume |
| fire retardant | aluminum trihydrate (ATH)[3] | 2 cups |
| microspheres | K20 Scotchlite glass bubbles[4] | 33% to 40% by resin weight |
| additive | 92 h iron black temper color[5] | 1 tablespoon |
| additive | 10 h light buff temper color[6] | 8 tablespoons |
| additive | wood ash (brown color)[7] | 6 cups |
| additive | glass particles[8] | as needed |

[1]fire retardant resin available from Reichold of Raleigh, North Carolina.
[2]available from any commercial source as a 9% to 30% active peroxide mixture.
[3]available from commercial suppliers.
[4]available from 3M of Minnesota.
[5]available from Soloman Colors of Chicago.
[6]available from Soloman Colors of Chicago.
[7]available from commercial suppliers.
[8]available as, for example, DIAMOND DUST from masonry suppliers.
The material of EXAMPLE 2 is a class 1 fire retardant material.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form a catalyzed base material. When the desired viscosity is achieved, the mixing is stopped. The catalyzed base material will have a white or slightly off white color.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff and other additives are added while working continues. The mixing provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

EXAMPLE 3 brown ledge stone

| | | |
|---|---|---|
| resin | polylite 3402-00 resin[1] | 3 gallons |
| curing agent | methyl ethyl ketone peroxide[2] | 1% to 3% by resin volume |
| microspheres | K19 Scotchlite glass bubbles[3] | 22% to 38% by resin weight |
| additive | 92 h iron black temper color[4] | 1 tablespoon |
| additive | 10 h light buff temper color[5] | 2 tablespoons |
| additive | wood ash (brown color)[6] | 6–8 cups |
| additive | mica[7] | 1 teaspoon |
| additive | stonedust (crushed stone)[8] | 1 tablespoon |

[1]available from Reichold of Raleigh, North Carolina.
[2]available from any commercial source as a 9% to 30% active peroxide mixture.
[3]available from 3M of Minnesota.
[4]available from Soloman Colors of Chicago.
[5]available from Soloman Colors of Chicago.
[6]available from commercial suppliers.
[7]available from commercial suppliers.
[8]available from commercial suppliers.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form a catalyzed base material. When the desired viscosity is achieved, the mixing is stopped. The catalyzed base material will have a white or slightly off white color.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff is added while working continues. The remaining additives are added after the light buff. The mixing provides random veins and swirls of the wood ash, iron black, buff and other additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

EXAMPLE 4 grey stacked stone

| | | |
|---|---|---|
| resin | corebatch AB-017W0[1] | 3 gallons |
| curing agent | methyl ethyl ketone peroxide[2] | 1% to 3% by resin volume |
| microspheres | Q-CEL 300 s[3] | 22% to 38% by resin weight |
| fire retardant | aluminum trihydrate (ATH)[4] | 2 cups |
| additive | talc[5] | 4 tablespoons |
| additive | 92 h iron black temper color[6] | 10 tablespoon |
| additive | 10 h light buff temper color[7] | 4 tablespoons |
| additive | wood ash[8] | 6–8 cups |
| additive | glass particles[9] | as needed |
| additive | mica[10] | 2 teaspoons |
| additive | milled fibers[11] | as needed for strength |

[1]available from Reichold of Raleigh, North Carolina.
[2]available from any commercial source as a 9% to 30% active peroxide mixture.
[3]available from the PQ Corporation of Pennsylvania.
[4]available from commercial suppliers.
[5]available from commercial suppliers.
[6]available from Soloman Colors of Chicago.
[7]available from Soloman Colors of Chicago.
[8]available from commercial suppliers.
[9]available as, for example, DIAMOND DUST from masonry suppliers.
[10]available from commercial suppliers.
[11]available from commercial suppliers.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form a catalyzed base material. When the desired viscosity is achieved, the mixing is stopped. The catalyzed base material will have a white or slightly off white color.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff is added while working continues. The remaining additives are added after the light buff. The mixing provides random veins and swirls of the wood ash, iron black, buff and other additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. An artificial stone product comprising:
   a cured thermoset resin;
   about 8 percent to about 63 percent (by weight of thermoset resin) of microspheres homogeneously distributed within the thermoset resin; and
   at least one member selected from dry temper color, dry mortar, dye, pigment, paint, wood ash, mica, stone particles and glass particles, the at least one member being non-homogeneously distributed in the resin;
   wherein the artificial stone product has a density of 1.0 grams per cubic centimeter or less and an appearance characteristic of natural stone.

2. The artificial stone product of claim 1 wherein the cured resin is an polyester resin, and comprising about 22 percent to about 40 percent microspheres (by weight of resin), iron black dry temper color, light buff dry temper color and wood ash.

3. The artificial stone product of claim 1 comprising about 33 percent to about 40 percent microspheres (by weight of resin), iron black dry temper, light buff dry temper and wood ash, wherein the artificial stone material has the appearance of red-brown sandstone.

4. The artificial stone product of claim 1 having a specific gravity of less than 1.

5. An artificial stone product comprising:
   a cured thermoset resin;
   about 8 percent to about 63 percent (by weight of thermoset resin) of microspheres; and
   at least one member selected from dry temper color, dry mortar, dye, pigment, paint, wood ash, mica, stone particles and glass particles, the at least one member being non-homogeneously distributed in the resin;
   wherein the artificial stone product has a density of 1.0 grams per cubic centimeter or less and an appearance characteristic of natural stone and the thermoset resin in a catalyzed state when mixed with the microspheres has a viscosity of about $950 \times 10^6$ cps to about $1590 \times 10^6$ cps.

6. An artificial stone material produced by a process comprising:
   providing a point of use;
   adding a curing agent to a thermoset resin to form a catalyzed resin mixture in the vicinity of the point of use;
   adding about 8 percent to about 63 percent (by weight of catalyzed resin mixture) of microspheres to the catalyzed resin mixture;
   slowly mixing the microspheres and the catalyzed resin mixture to form a catalyzed base material having a viscosity of about $950 \times 10^6$ cps to about $1590 \times 10^6$ cps to form a catalyzed base material;
   adding at least one additive to the catalyzed base material; and
   lightly mixing the additive and catalyzed base material to form a catalyzed artificial stone mixture, wherein the additive is non-homogeneously distributed in the catalyzed artificial stone mixture and the artificial stone material closely approximates the look of natural stone.

7. The artificial stone product of claim 6 wherein the thermoset resin is an orthophthalate polyester resin, and comprising about 28 percent to about 39 percent microspheres (by weight of resin), iron black dry temper, light buff dry temper and wood ash, wherein the artificial stone material has the appearance of natural grey field stone.

8. The artificial stone product of claim 6 comprising about 33 percent to about 40 percent microspheres (by weight of resin), iron black dry temper, light buff dry temper and wood ash, wherein the artificial stone material has the appearance of red-brown sandstone.

9. The artificial stone material of claim 6 wherein the catalyzed artificial stone mixture has randomly oriented veins of additives.

10. The artificial stone material of claim 6 wherein the catalyzed base material is a substantially homogeneous mixture of microspheres and catalyzed resin.

* * * * *

UNITED STATES PATENT AND TRADEMARK OFFICE
CERTIFICATE OF CORRECTION

PATENT NO.         : 7,198,833 B1                                              Page 1 of 1
APPLICATION NO.    : 10/611581
DATED              : April 3, 2007
INVENTOR(S)        : West It is certified that error appears in the above-identified patent and that said Letters Patent is hereby corrected as shown below:

Column 10:

Line 36, delete "substantially".

Signed and Sealed this

Twentieth Day of November, 2007

JON W. DUDAS
*Director of the United States Patent and Trademark Office*